United States Patent
Cleve et al.

(10) Patent No.: US 9,148,724 B2
(45) Date of Patent: Sep. 29, 2015

(54) AUDIO SYSTEM SIGNAL PROCESSING CONTROL USING MICROPHONE MOVEMENT INFORMATION

(71) Applicant: REVOLABS, INC., Sudbury, MA (US)

(72) Inventors: Pascal Cleve, Sudbury, MA (US); Thomas Cotton, Harvard, MA (US); Mark Desmarais, Northborough, MA (US); Jonathan Schau, Sudbury, MA (US)

(*) Notice: Subject to any disclaimer, the term of this patent is extended or adjusted under 35 U.S.C. 154(b) by 287 days.

(21) Appl. No.: 13/746,112

(22) Filed: Jan. 21, 2013

(65) Prior Publication Data

US 2014/0205105 A1    Jul. 24, 2014

(51) Int. Cl.
 H04B 3/20 (2006.01)
 H04R 3/02 (2006.01)
 H04M 3/56 (2006.01)
 H04M 9/08 (2006.01)
 H04R 29/00 (2006.01)
 H04R 3/00 (2006.01)

(52) U.S. Cl.
 CPC .............. H04R 3/02 (2013.01); H04M 3/568 (2013.01); H04M 9/082 (2013.01); H04R 3/005 (2013.01)

(58) Field of Classification Search
 CPC .......... H04R 3/02; H04R 3/005; H04M 3/568; H04M 9/082
 USPC .......... 381/66, 86, 122, 103, 104, 71.1, 26, 58
 See application file for complete search history.

(56) References Cited

U.S. PATENT DOCUMENTS

| | | | |
|---|---|---|---|
| 2009/0123002 A1* | 5/2009 | Karthik et al. | 381/66 |
| 2011/0158416 A1* | 6/2011 | Yuzuriha | 381/26 |
| 2013/0129102 A1* | 5/2013 | Li et al. | 381/71.1 |
| 2014/0112487 A1* | 4/2014 | Laska et al. | 381/66 |

* cited by examiner

*Primary Examiner* — Vivian Chin
*Assistant Examiner* — Ammar Hamid
(74) *Attorney, Agent, or Firm* — Robert Schuler

(57) ABSTRACT

An audio conferencing system has a base station, a speaker and one or more mobile microphones, and it operates to receive audio information from both a far-end audio source and a near-end audio source and to process the audio information for transmission to a far-end audio conferencing system. At least one of the mobile microphones has a motion detection device and operates to send detected motion information to the base station. The base station operates to control the processing of audio information it receives from the microphone according to the detected microphone motion information.

14 Claims, 6 Drawing Sheets

AUDIO CONFERENCING SYSTEM 100 (PRIOR ART)

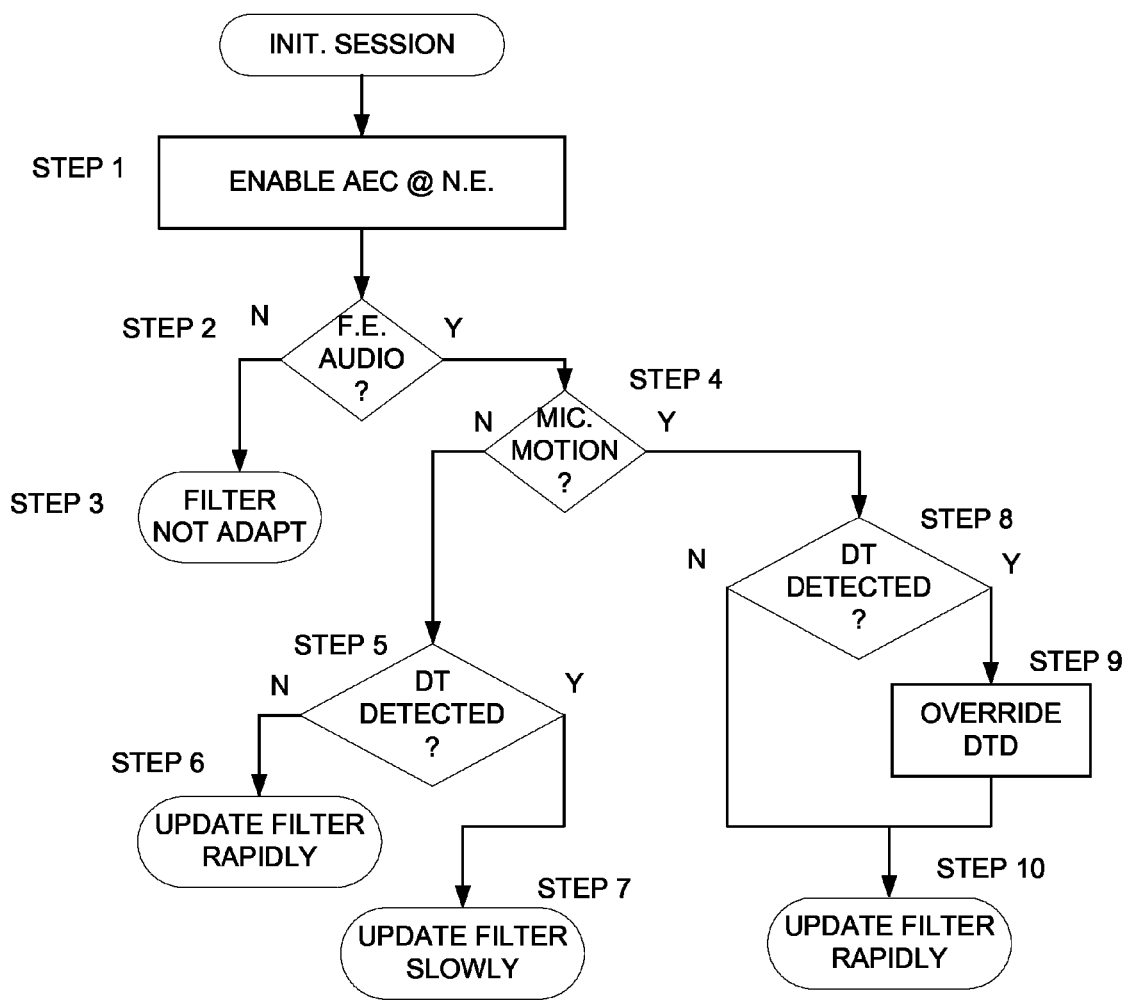

AUDIO SYSTEM SIGNAL PROCESSING CONTROL USING MICROPHONE MOVEMENT INFORMATION

1. FIELD OF THE INVENTION

The present disclosure relates to an audio processing system having microphones with motion sensing functionality, and using microphone motion information to control the manner in which audio signal are processed in the system.

2. BACKGROUND

Meetings conducted in two separate locations with at least one of the locations involving two or more individuals can be facilitated using an audio conferencing system. Audio conferencing systems typically include some number of microphones, at least one loudspeaker and a base station which is connected to a public communication network. In such a system, microphones can operate to pick up acoustic audio signals (speech) from a near side speaker and transmit the signals to a base station which generally operates to provide session control and to process the audio signals in a number of ways before sending it to a far side communication device to be played by a loudspeaker. Among other things, the base station can be configured with functionality to amplify audio signals, it can regulate microphone signal gain (automatic gain control or AGC) and microphone, suppress noise, and it can automatically remove acoustic echo present in the system.

FIG. 1 is a diagram showing functional elements comprising a commercially available audio conference system 100. The system 100 can be comprised of a number of wireless or wired microphones 11 and 12 respectively, one or more loudspeakers 13, and an audio control and processing device 15. Typically, in such room audio systems, the loudspeakers 13 are wired to the device 15 and the processing device 15 is comprised of complex digital signal processing and audio signal control functionality. The audio signal control can include functionality to automatically control near side audio signal gain, functionality to control microphone sensitivity, and system mode control (duplex/half duplex modes) to name only a few, and the digital signal processing can include automatic echo cancellation (AEC) functionality, residual echo suppression functionality or other non-linear processing, noise cancellation functionality and double talk detection and mitigation.

AEC functionality is an essential element in audio conferencing systems, and it generally operates to remove acoustic echo from a near side audio signal prior to the signal being transmitted to a far side system. Specifically, acoustic echo occurs when a far side audio signal received and played by a near side system is picked up by a near side microphone as acoustic echo. An audio signal generated by the near side microphone that includes the acoustic echo, is then sent to the far end system where the far end talker can hear the echo. This acoustic echo is distracting and can severely degrade the quality of an audio conferencing session if it is not effectively cancelled at the near end audio conferencing system. FIG. 2 is a diagram showing typical prior art AEC functionality that can be implemented in an audio conferencing system 200. The system 200 includes an adaptive filter 210, a summation function 220, a loudspeaker and a microphone. In operation, a far end (F.E.) audio signal is received at the system 200 and sent to both a loudspeaker and to the adaptive filter 210 which operates to, among other things, derive an estimated echo signal which is sent to a summation function 220. The loudspeaker plays the F.E. audio signal and the microphone proximate to the loudspeaker can pick up the acoustic audio signal played by the loudspeaker and send it (microphone signal) to the summation function 220 which operates to subtract the estimated echo from the microphone signal. The output of the summation function 220 is an error signal 230, and this error signal is an input to an adaptive algorithm that operates to update coefficients comprising the adaptive filter. The resultant filter coefficients are an approximation of a transfer function, which models the acoustic environment between the loudspeaker and the microphone. The updated filter coefficients are used to minimize the error signal (which in the absence of any N.E. audio is ideally zero). As long as most of the audio energy in the microphone signal is comprised of F.E. audio, the adaptive filter is able to converge to a solution, which is the minimization of the error signal. However, the adaptive filter 210 may not converge within a reasonable period of time, or may never be able to converge to a solution, if N.E. audio (from a talker proximate to the microphone) is present in the microphone signal with or without F.E. audio also being present. In the case that only N.E. audio is present in a microphone signal, the coefficients associated with the adaptive filter can be frozen or the rate at which the coefficients are calculated can be retarded, this prevents the filter from diverging from a previous solution. Further, in the event that both N.E. and F.E. audio are present in a microphone signal, it is necessary that the filter is able to adapt to cancel any acoustic echo present in a microphone signal, but not attempt to adapt to the N.E. audio component of the signal. In this case, the N.E. audio can be suppressed in some manner, such as the system 100 switching to a half duplex mode of operation in which only the F.E. audio is processed by the adaptive filter. The presence of both N.E. and F.E. audio in a microphone signal is referred to as double talk.

As described above, double talk occurs when a far side talker and a near side talker speak at the same time. If a DT condition is not correctly detected by the audio conferencing system, AEC functionality may not be able to converge to a solution, and acoustic echo can be transmitted back to the far end. Typically, conferencing systems handle double talk by detecting when both a F.E. talker and a N.E. talker are speaking at the same time, and reacting by either preventing a filter from adapting (slowing or freezing the filter coefficients) or by transitioning to a half duplex mode of operation in which near side speech is suppressed. FIG. 3 is a diagram showing an audio conferencing system 300 that includes acoustic echo cancellation functionality 310, a double talk detector (DTD) 320, a loudspeaker 330 and a wireless microphone 340. The DTD 320 generally operates to detect audio signal energy in a F.E. signal, received from a F.E. audio source, and a N.E. audio signal received from the microphone which it uses to determine whether or not the system should enter into the double talk mode of operation.

3. BRIEF DESCRIPTION OF THE DRAWINGS

The present invention can be best understood by reading the specification with reference to the following figures, in which:

FIG. 6 is a logical flow diagram of an embodiment of the invention.

4. DETAILED DESCRIPTION

Figure 1:
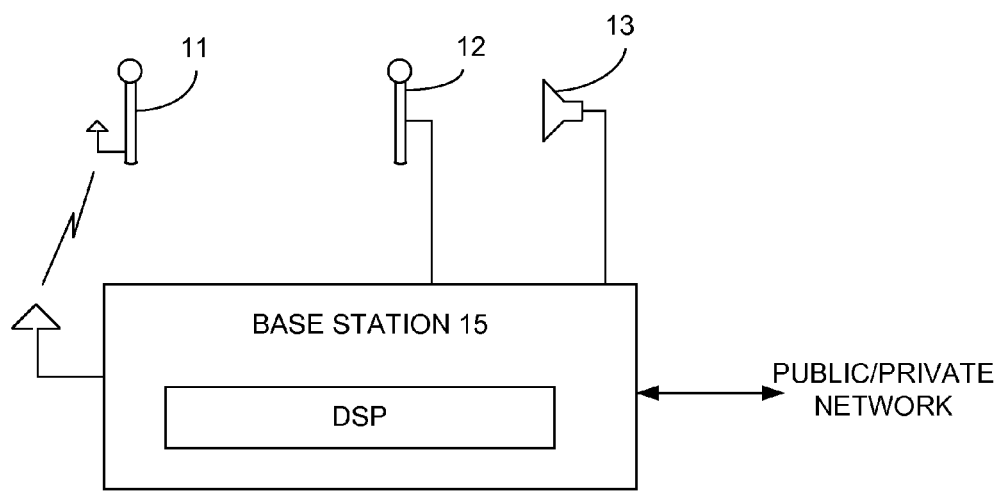
FIG. 1 is a high-level diagram showing functional elements comprising an audio conferencing system 100.
Figure 2:
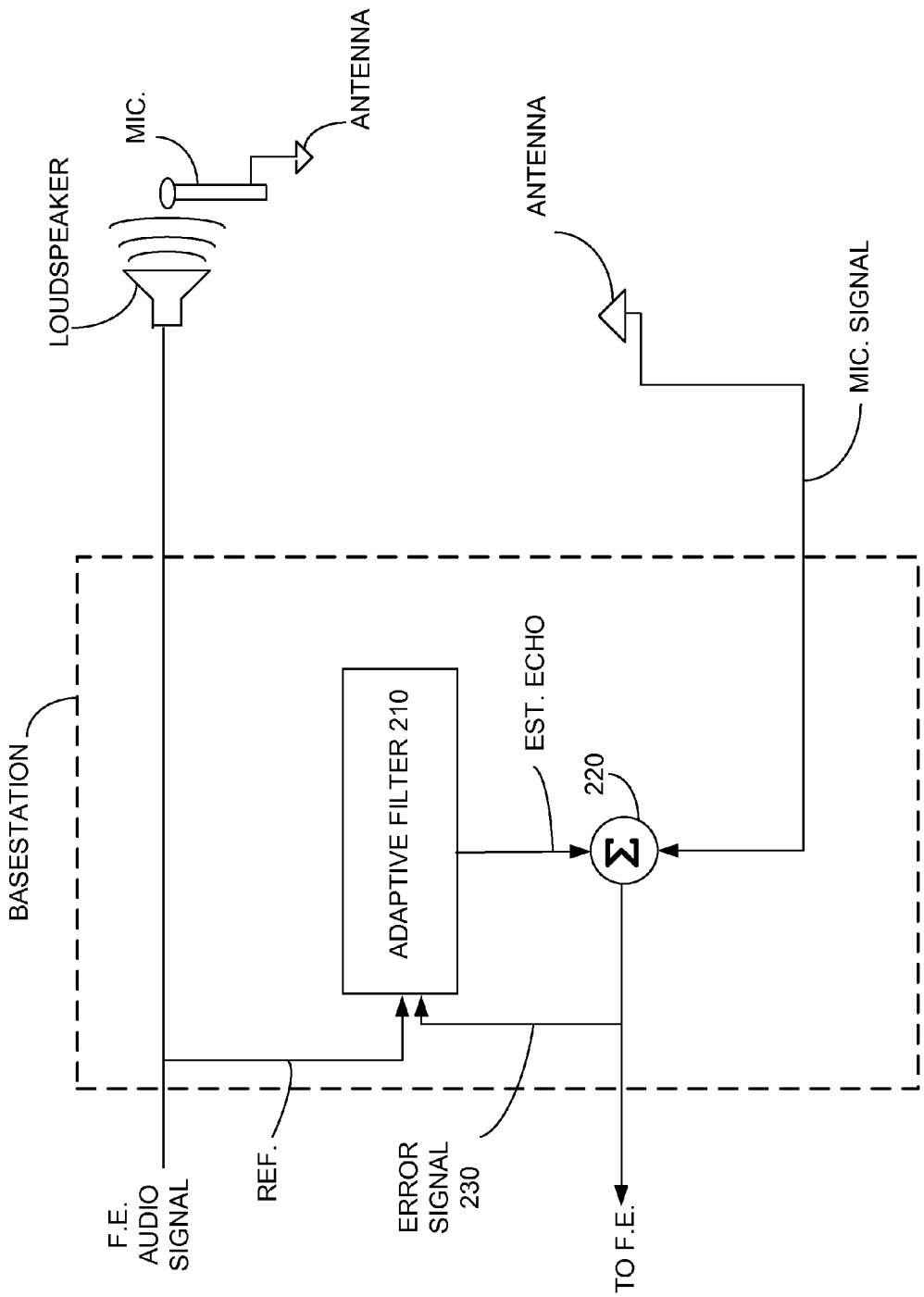
FIG. 2 is a diagram showing functional elements comprising an audio conferencing system 200.
Figure 3:
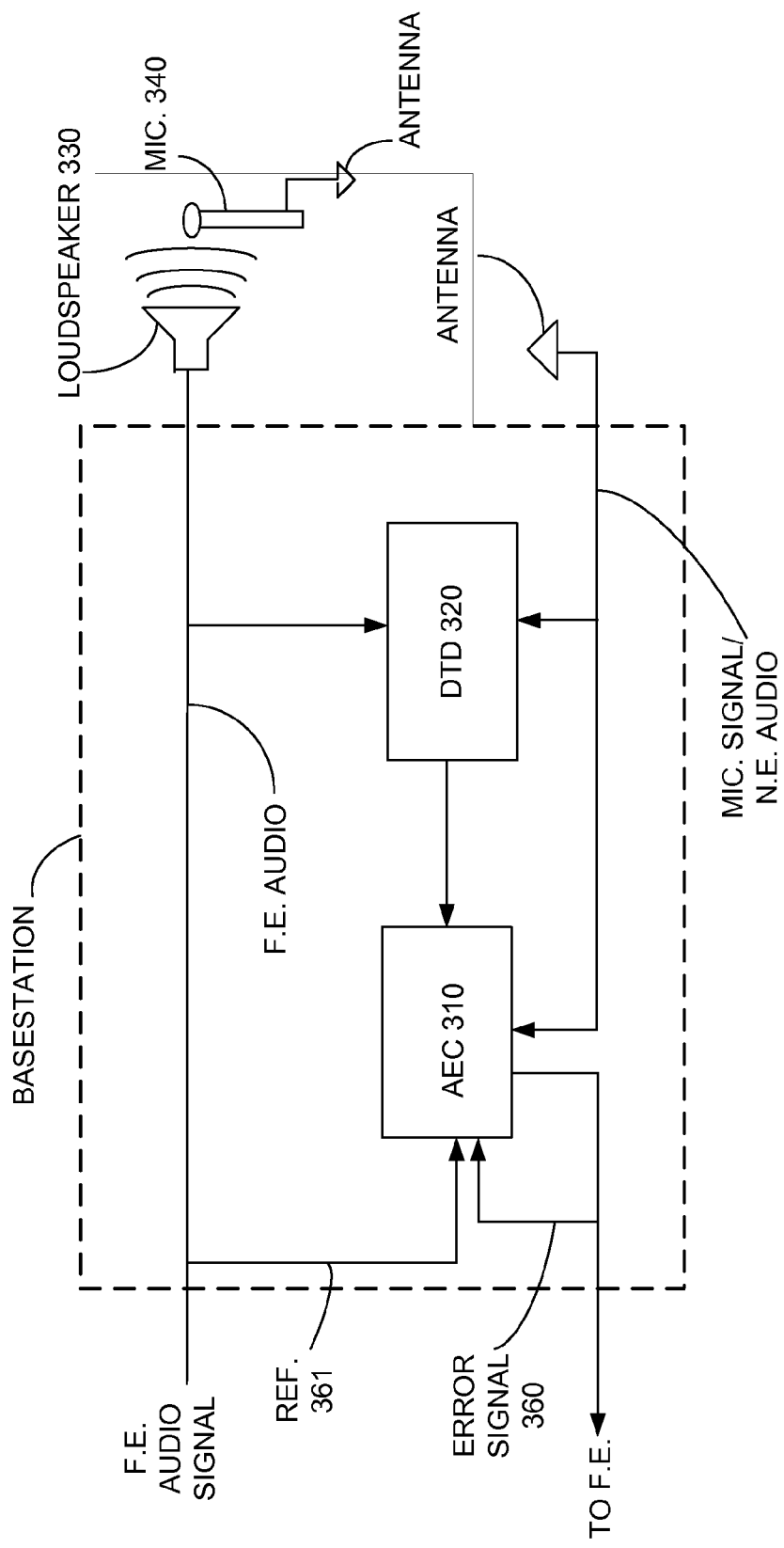
FIG. 3 is a diagram showing functional elements comprising an audio conferencing system 300 with a double talk detector.

Many audio conferencing systems, such as the system 300 described with reference to FIG. 3, are designed to support wireless microphones 340 which, when attached to or carried by an individual, allow them to freely walk around a room while talking. Moving a microphone around a room in this manner changes the acoustic path between a loudspeaker associated with the conferencing system and a microphone proximate to the loudspeaker. AEC 310 functionality comprising the audio conferencing system 300 generally operates to adapt to a changing acoustic environment based upon, among other things, audio information it receives in both a reference signal and an error signal, such as the reference signal 361 and error signal 360 of FIG. 3. A changing acoustic path, as the result of microphone movement for instance, can cause the error signal to become larger, which in turn causes the AEC to update its filter coefficients in order to minimize the error and cancel acoustic echo. In the presence of F.E. audio, and in order to prevent an adaptive filter from diverging from a solution, typical AEC functionality does not permit filter coefficients to be updated prior to determining whether a double talk (DT) condition exists or not.

It is not an easy task to discriminate between F.E. audio that leaks through an adaptive filter and N.E. audio that leaks through an adaptive filter (audio that leaks through the filter in this context is referred to as residual echo). Many papers have been published and many solutions have been directed to solutions for this problem. To make matters even more complicated, in the event microphone movement is present during the time F.E. audio is received by a conferencing system, an AEC function, such as the AEC 310 in FIG. 3, is typically unable to accurately distinguish between a double talk condition and microphone movement. If the AEC functionality incorrectly detects a DT condition, it will react by slowing or freezing the rate at which adaptive filter coefficients are updated (because it incorrectly detects a DT condition). When in this state, the ACE 310 tends to diverge from an optimal echo cancellation solution, and so the F.E. starts to hear acoustic echo.

Accordingly, it was discovered that information indicative of microphone motion/movement can be used by an audio conferencing system to control certain operational characteristics of the system, thereby improving the quality of a N.E. audio signal sent to a F.E. audio communication system (whether it be a conferencing device or not). One or more motion detection/sensing devices can be included in a microphone (wired or wireless) that operates to detect microphone motion of any kind, such as but not limited to a direction, speed, acceleration and change in orientation/attitude of a microphone. Information corresponding to the detected microphone motion/movement can be sent to an audio conferencing system which can use it to control certain operational characteristics of the system, such as operating parameters associated with an acoustic echo cancellation function (rate of adaption or operating frequency spectrum, noise reduction, residual acoustic echo cancellation), the operating parameters of the microphone (gain, sensitivity) or a double talk detector. Using detected microphone motion in this way allows the audio conferencing system to more accurately adapt to changes in an acoustical environment resulting in a higher quality N.E. and F.E. audio signal.

Figure 4:
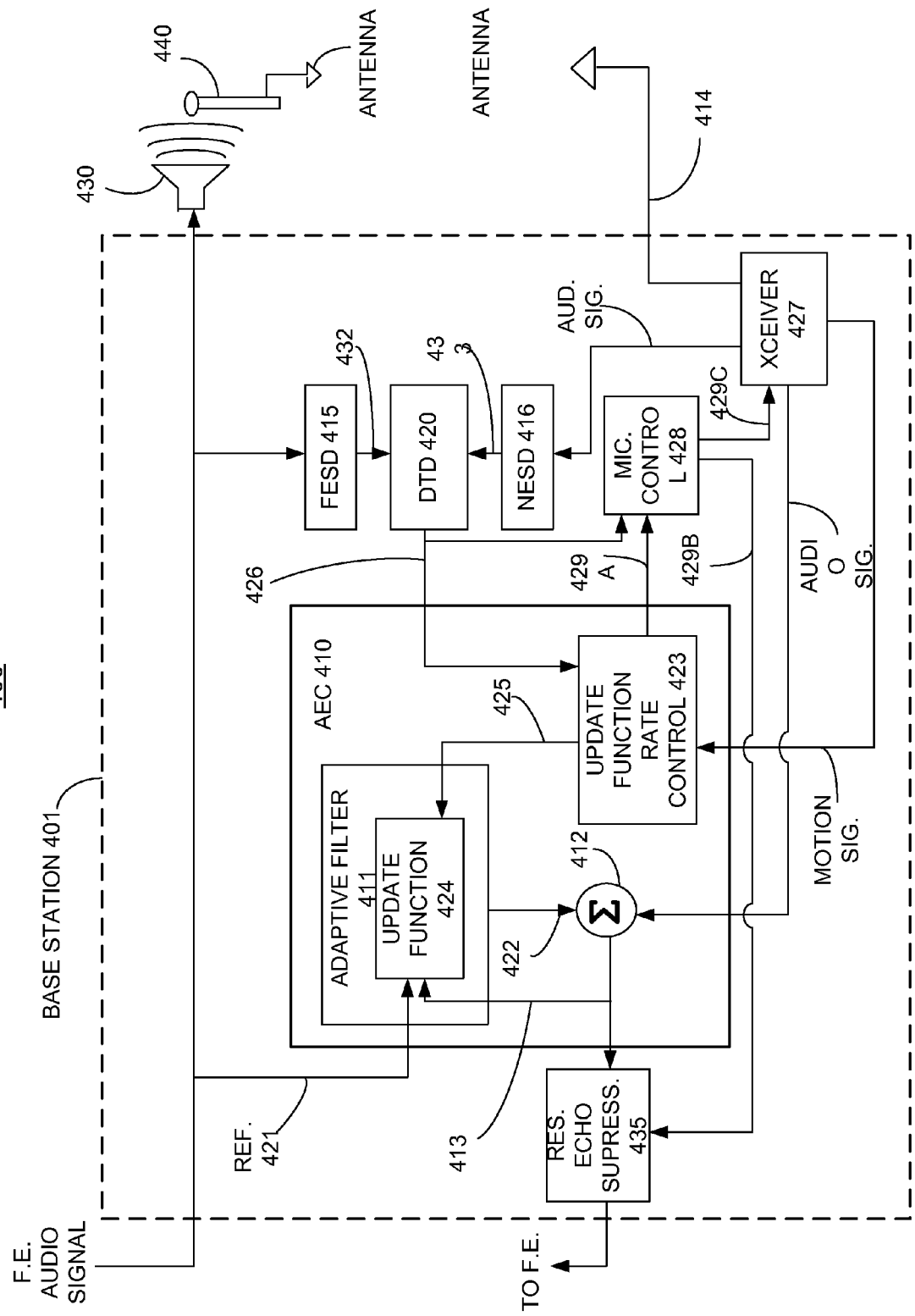
FIG. 4 is a detailed diagram of the functional elements comprising conferencing system 400.

FIG. 4 is a diagram showing an audio conferencing system 400 having a base station 401, one or more loudspeakers 430 and one or more wireless and/or wired microphones 440. The base station 401 has acoustic echo cancellation (AEC) functionality 410, a F.E. Signal Detector (FESD) 415, a N.E. Signal Detector (NESD) 416, a Double Talk Detector (DTD) 420, microphone operation control functionality 428, a residual echo suppression function 435 (suppression), and a transceiver 427. The AEC functionality 410 can be implemented in any appropriate digital signal processing device or devices (not shown). The FESD 415 generally operates to detect audio signal energy in a F.E. signal that is received at the system 400 and which is played by the loudspeaker 430. Information corresponding to whether or not F.E. audio signal energy is detected is sent to the DTD 420 in a signal 432. The NESD 416 generally operates to detect audio signal energy in a N.E. signal that is generated by a local audio source (talker), picked up by the microphone 440 which transmits information corresponding to the audio signal and microphone motion in separate channels to the base station 401. The transceiver 427 at the base station receives the audio and motion information in a microphone signal 414, and sends the audio signal information to both the NESD 416 and the summation function 412, and sends the motion information to a filter coefficient update function (update function) rate control 423. Information corresponding to whether or not N.E. audio signal energy is detected is sent by the NESD to the DTD 420 in a signal 433. The DTD 420 generally operates on information received from both the FESD and the NESD to determine whether or not both F.E. and N.E. audio is present at the same time. If double talk is detected, the DTD 420 generates and sends a signal 426 to both a update function rate control 423 and to the microphone control 428 that includes information indicating that a double talk condition is detected. In normal operation, when the control 423 receives a signal indicating that double talk is detected, it generates and sends a rate control signal 425 to an update function 424 that causes it to slow or stop the rate at which the filter 411 adapts, otherwise, the adaptive filter 411 will diverge from a current solution which typically results in a far end listener hearing echo. The update function 424 is comprised of an appropriate adaptive algorithm that operates on audio information comprising a reference signal and an error signal to update the adaptive filter 411 coefficients. The signal 426 can be used by the microphone control 428 to generate and send a signal 429B that controls the function 435 to suppress the N.E. audio during the time that double talk is detected. Either one or both of these techniques for handling double talk can be implemented in an audio conferencing system, such as the system 400. The design and operation of a residual echo suppression function, such as the function 435 in FIG. 4, is well known to audio engineers, and so will not be described here in any detail. Generally, such residual echo suppression functionality operates on an AEC output to remove acoustic echo that bleeds through the AEC function, such as the output of the summation function 412 comprising the AEC 410 in FIG. 4.

Continuing to refer to FIG. 4, the AEC functionality 410 is comprised of, among other things, an adaptive filter 411, a summation function 412, and the update function rate control 423. The adaptive filter 411 can be a finite impulse response (FIR) filter or any other appropriate type of filter that is able to adapt to a changing acoustic environment to cancel acoustic echo. Among other things, the filter 411 is comprised of the adaptive algorithm 424 (referred to herein as the adaptive function 424) that generally operates on a reference signal 421 (which is the F.E. audio signal) and an error signal 413 (which is the output of the summation function 412) to update a plurality of adaptive filter coefficients (not shown). The output 422 of the adaptive algorithm 424 is an estimate of acoustic echo in a microphone signal 414. This echo estimate 422 is sent to the summation function 412 which operates to subtract the estimated echo from the microphone signal 414 (audio component of the microphone signal). According to one embodiment of the invention, when the rate control 423 receives a signal from the DTD 420 indicating that the DTD detects a DT condition, it checks the motion signal to determine if there is current microphone movement. If the microphone is in motion and the DTD detects a DT condition, the rate control 423 sends a rate control signal 425 to the adaptive function 424 which has the effect of overriding normal operation of the adaptive filter 411 to freeze it's coefficients and permits the filter 411 to adapt normally. More specifically, the update function rate control 423 is comprised of specially designed computer logic that operates to control certain operational characteristics of the AEC 410. This logic is stored in a non-transitory computer memory device (not shown) associated with the base station 401, and this logic operates to continually monitor the DTD 420 output signal 426 and microphone motion information comprising the microphone signal 414 to determine whether to generate and send a rate control signal to the filter 411 to override the normal operation of the AEC 410 during a detected DT condition.

While the logic comprising the update function rate control 423 can be designed to react to the detection of microphone motion by simply overriding the normal tendency of a detected DT condition to freeze the filter coefficients, therefore allowing the filter to adapt normally, the rate at which the filter adapts can be controlled according to the type or speed of detected microphone motion. For example, in the case that rapid microphone movement is detected (as the result of the microphone being dropped), then the rate control 423 can send a message to the microphone control 428 to mute the microphone 440.

Referring again to FIG. 4, in addition to the microphone control 428 receiving a signal 426 from the DTD 420, it receives a signal 429A from the rate control 423 that includes information indicative of microphone movement. Upon receipt of this microphone movement information, the microphone control 428 can generate and send a signal 429C to the microphone (or some other conferencing system 400 functionality) that is used to reduce the microphone sensitivity and/or reduce its gain.

It should be understood that while the DTD 420, the FESD 415 and the NESD 416 functionalities in FIG. 4 are, for the purpose of this description, illustrated to be separate from the AEC 410 functionality, they can be integrated into the AEC functionality.

Figure 5:
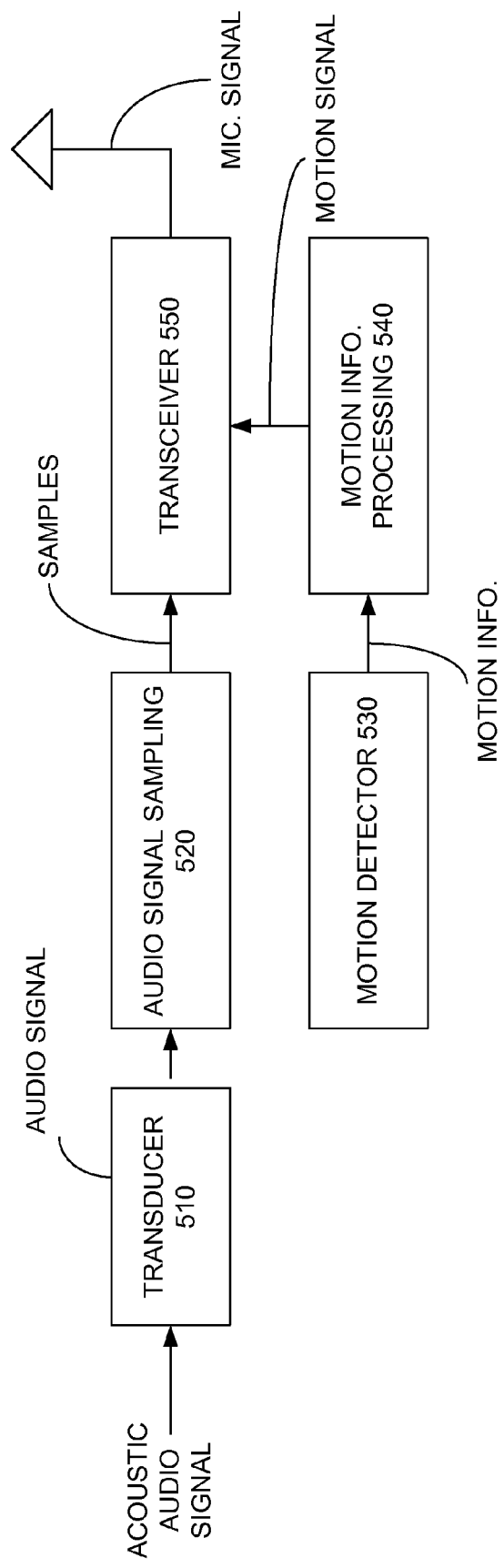
FIG. 5 is a diagram showing functional elements of a microphone 440.

FIG. 5 is a diagram showing the functional elements comprising a wireless or a wired microphone 440 of FIG. 4. The wireless microphone 440 can have an transducer 510 for receiving an acoustic audio signal and it can have audio signal sampling functionality 520. An acoustic audio signal received at the transducer 510 can be sampled by the functionality 520, and the audio signal samples can be sent to a radio/transceiver 550 for transmission to the base station 401 of FIG. 4 in the microphone signal 414. The wireless microphone 440 can also have one or more motion detection devices 530 for detecting a number of different types of microphone motion or movement. In the context of this description, the different types of microphone movement can be directional motion and/or velocity, rotational motion or tilt, and acceleration. Microphone motion can also include an attitude or orientation of the microphone with respect to a surface, such as being either upside down or right side up. According to this description, right side up means that the transducer element on the microphone is facing away from the surface upon which the microphone is resting. The one or more devices 530 that are suitable for detecting the different types of motion can be, but is not limited to, a three axis accelerometer or an inclinometer for instance.

The motion detector 530 in FIG. 5 generates information indicative of movement and sends this movement information to a microphone movement information processing function 540 comprising the microphone 440. Alternatively this movement information can be sent directly to a radio/transceiver 550 for inclusion in a microphone signal which can be sent to functionality (not shown) on the base station 401 in FIG. 4 for processing. In the event that the motion information is sent to the processing function 540 residing on the microphone, this function can operate on the motion information to determine that the microphone is currently in motion or not, and to determine what type the type of motion that is detected. The output of the processing 540 is a motion signal comprising information indicating that the microphone is currently in motion or not, and alternatively, the signal can include information indicating what type of motion is currently being detected. In the event that the motion information is sent directly to the transceiver without being processed, similar motion information processing functionality (not shown) can be implemented in the base station in order for the system 400 to determine what type of microphone motion was detected. The audio information comprising the audio samples and the motion information can be included in the payload portion of the microphone signal 414 for transmission to the base station 401 of FIG. 4. The microphone signal 414 can be formatted according to any appropriate wireless signal transmission protocol format, such as the DECT signal transmission format or the WiFi signal transmission formal for instance.

According to one aspect of the invention, information corresponding to motion detected at the microphone 440 can be used to control one or more of an operational characteristic of the audio conferencing system. The operational characteristics can be audio signal processing parameters or they can be microphone signal control parameters. The audio signal processing parameters can comprise the rate a which a filter, such at the filter 411 of FIG. 4, is control to adapt to cancel acoustic echo, it can be a noise suppression/reduction setting, it can be a particular frequency spectrum over which the adaptive filter operates to cancel acoustic echo, and it can be the activation of residual acoustic echo cancellation functionality. The microphone signal control parameters can comprise a microphone sensitivity setting or a microphone signal gain setting or a N.E. audio signal suppression setting.

Information indicative of microphone motion, and/or the type of detected microphone motion, can be used to selectively control these audio conferencing system operational characteristics to improve the quality of an audio signal generate by a N.E. audio source and sent to the F.E.

As described earlier with reference to FIG. 4, the specially designed logic comprising the adaptive rate control function 423 operates to control the rate a which the filter 411 coefficients are updated according to motion information comprising a microphone signal 414 and information comprising a signal 426 generated by the DTD 420. For the purpose of the following description, it is assumed that microphone motion information is indicative that either a microphone is in motion or it is not in motion, but it should be understood that this microphone motion information can represent any type of microphone motion previously described here. Further it should be understood that while the present description refers to overriding the normal tendency of the AEC to freeze the filter coefficients such that the filter is able to adapt normally, the rate control 423 can control the rate at which the filter 411 coefficients can be updated to be any appropriate update rate, which can range from, but is not limited to, one update per second to ten updates per second. The operation of the computer logic comprising the update function rate control 423 is now described with reference to FIG. 6. a communication session is initiated by a N.E. audio conferencing system, such as the conferencing system 400 described with reference to FIG. 4, and in Step 1, the system 400 enables/initializes the AEC functionality 410 comprising the base station 401 in FIG. 4. In Step 2, if the FESD 415 does not detect F.E. audio, then the logic proceeds to Step 3 and the filter 411 coefficients are not updated. On the other hand, if in Step 2 F.E. audio is detected, then the logic proceeds to Step 4 where a determination is made (examining the motion signal) whether or not the microphone is currently being moved. If the determination in Step 4 is that the microphone is not currently being moved, then the logic proceeds to Step 5, where the rate control 423 checks to see if the DTD 420 is detecting a DT condition. If in Step 5 no DT condition is detected, then the logic proceeds to Step 6 and the filter coefficients are permitted to update normally (relatively more rapid than if DT is detected). On the other hand, if in Step 5 a DT condition is detected, then the logic proceeds to Step 7 and the rate control 423 operates to slow the rate at which the filter 411 coefficients are updated (the coefficients can be frozen or they can be updated at a rate that does not allow the filter to appreciably corrupt any N.E. audio).

Returning to Step 4 in FIG. 6, if in this Step the rate control function 423 comes to the determination that the microphone is currently being moved, then the logic proceeds to Step 8 and function 423 determines whether or not the DTD 420 has identified a DT condition, and if a DT condition is detected, then in Step 9 the rate control function 423 operates to override the normal tendency of the AEC to freeze or slow the rate at which the filter 411 coefficients are updated and retunes the DTD to adapt at a faster rate. If, however, in Step 8, it is determined the a DT condition is not present, then the logic proceeds to Step 10 and the filter 411 is updated as needed to adapt to the acoustic path changes as a consequence of the microphone being moved.

The forgoing description, for purposes of explanation, uses specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of controlling a rate at which an adaptive filter in an audio conferencing system is updated, comprising:

detecting a microphone movement, the microphone associated with the audio conferencing system;

receiving from the microphone an indication of the microphone movement and at the same time detecting that a double talk condition exists in the audio conferencing system; and receiving an audio signal from the microphone and using the received indication of the detected microphone movement to control the rate at which the adaptive filter is updated in response to the detected microphone movement, wherein controlling the rate at which the adaptive filter is updated comprises overriding an operation of the audio conferencing system to prevent changing the rate at which coefficients associated with an adaptive filter are updated.

2. The method of claim 1, wherein updating the adaptive filter comprises calculating updated filter coefficients.

3. The method of claim 2, wherein the audio signal is comprised of audio information received by the audio conferencing system from a remote audio conferencing system and audio information received by the audio conferencing system from a local audio source.

4. The method of claim 1, wherein the microphone movement is any one of a detected microphone velocity, microphone acceleration, direction of microphone movement, microphone rotational movement, and microphone tilt.

5. The method of claim 1, wherein the adaptive filter is updated more rapidly if microphone movement is detected relative to if no microphone movement is detected.

6. The method of claim 1, wherein the adaptive filter is not updated if no microphone movement is detected.

7. An audio conferencing system, comprising:

a microphone having a motion detector for detecting microphone movement;

a double talk detector for detecting a double talk condition resulting from the presence of near end and far end audio; and a base station associated with the microphone having acoustic echo cancellation functionality, characterized by:

the base station operating to receive an indication of the microphone movement and using this indication of microphone movement to override an operation of the audio conferencing system to prevent changing the rate at which coefficients associated with an adaptive filter are updated during a time that both the microphone movement and the double talk condition are detected at the same time.

8. The audio conferencing system of claim 7, wherein the motion detector is a three axis accelerometer.

9. The audio conferencing system of claim 7, wherein the microphone is a wireless or a wired microphone.

10. The audio conferencing system of claim 7, wherein the base station is connected over a network to a far end audio conferencing system.

11. The audio conferencing system of claim 7, further comprising a loudspeaker.

12. The audio conferencing system of any of claim 7, wherein the acoustic echo cancellation functionality controls the rate at which the filter adapts to a changing acoustic environment.

13. The audio conferencing system of claim 1, wherein the rate control means operates to accelerate the rate of the filter adaption if microphone movement is detected.

14. The audio conferencing system of claim 7, wherein the acoustic echo cancellation functionality comprises means to control the rate at which the filter adapts to a changing acoustic environment.

\* \* \* \* \*